Nov. 19, 1968 R. J. HAMMOND 3,411,792
RECORD PLAYER
Filed Oct. 18, 1965
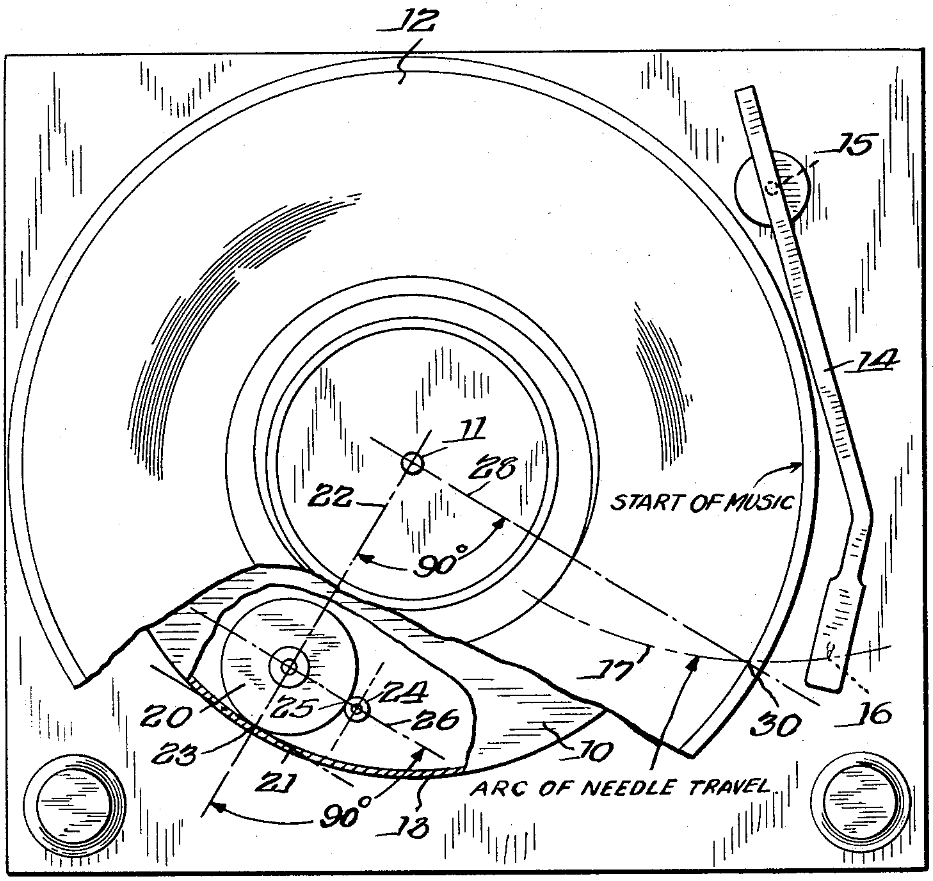
Inventor.
Robert J. Hammond,
By Brown, Jackson, Boettcher & Dienner
Att'ys.

United States Patent Office 3,411,792

Patented Nov. 19, 1968

3,411,792
RECORD PLAYER

Robert J. Hammond, Stevensville, Mich., assignor to V-M Corporation, Benton Harbor, Mich., a corporation of Michigan Filed Oct. 18, 1965, Ser. No. 497,220
1 Claim. (Cl. 274—39)

ABSTRACT OF THE DISCLOSURE

Record player having its turntable rotated by a motor driven pulley through an idler having tangential contact with a peripheral flange of the turntable, the pulley engaging the periphery of the collar along an axis including the centers of the pulley and idler; the record player having its tone arm mounted so that its needle moves in an arcuate path during record play which is generally radially of the turntable and parallel to said pulley-idler centers axis, said arcuate path being also normally disposed to a radial axis which includes the center of the turntable, the center of the idler and the point of contact the idler with the turntable flange.

This invention relates to a record player turntable and more particularly to a novel arrangement of the turntable drive which minimizes rumble transmission during the playing of recorded music on the player.

It is a prime objective in the design of a high-fidelity phonograph to achieve faithful reproduction of the original sound without including distortion or extraneous noises in such reproduction. Consumers annually spend many millions of dollars for "noise-free," sound reproduction equipment and literally thousands of people are employed in the design and manufacture of such equipment.

At the present state of the art, the highest quality record reproducing systems commercially available will suffer from one outstanding source of noise, which becomes more noticeable as the fidelity of the equipment is improved. This noise is no worse in low-cost players manufactured by the millions than in very costly players, since its reduction is not so much a question of more costly parts and construction as it is a problem inherent in design. This noise present in all record reproduction devices is called "rumble."

Rumble can be defined as an extraneous mechanical vibration resulting in relative motion between a tone arm and the record. To be objectionable, this motion must occur in the audible range, have an amplitude of at least one-millionth of an inch, and be capable of exerting at least one-millionth of a gram of force.

The vibrations resulting in rumble are caused by the motion of the turntable due to its bearing system, the tone arm on its pivots, the motor and its drive system, and electro-magnetic coupling from the motor. The transmission from these sources to the transducing region can also take a variety of paths. Vibration of the motor drive pulley surface may occur due to surface finish, eccentricity, motor bearing noise, shaft straightness, and other motor vibrations affecting the pulley. These vibrations may be transmitted to an idler by which the drive pulley turns the turntable. Vibrations may occur in the idler due to surface finish, eccentricities, and bearing noise; and these vibrations may be transmitted to the turntable. The modes of the transmitted vibrations to the turntable and their effect on the record at the playing area must be dealt with to reduce the effects of rumble.

Rumble is normally worse on the outside edge of a record since turntable vibrations, other than strict translatory motions, increase with the distance from the supporting bearings. Therefore the unmodulated areas, such as the lead-in grooves, will be generally higher in rumble than the trip grooves. The rumble playing time will be normally longer in the unmodulated areas of the lead-in grooves.

At the start of the record playing, there is normally a reduced sound level in the listening area. This reduced level makes rumble at the onset of playing more noticeable than at a cross-over point between recorded portions or at the end of the recording, since the recorded sound level will normally run about 50 decibels higher than rumble level.

Further, disagreeable rumble may be caused by the relationship between a point at which the idler contacts the turntable and a line described by the needle, mounted to the tone arm, as it tracks across the record when playing. When the line described by the needle varies from a neutral axis of tipping motion, an increase in rumble occurs as a result of the translated forces. The neutral axis of tipping motion is substantially normal to a line through the idler center and the turntable center.

The present invention reduces objectionable rumble by locating the idler contact point to the turntable on an axis which is substantially at a 90 degree angle from the line described by the needle as it tracks across the record when playing. Further a driven motor pulley contacts the idler at a point on an idler-motor pulley axis established by the center of the idler and the center of the motor pulley. The idler-motor pulley axis is substantially normal to the line through the idler center and the turntable center. By the present invention, vertical vibrations transmitted to the turntable by the idler would be such that the pickup is on the neutral axis; lateral vibrations transmitted by the idler would be parallel to the groove being played and would not be reproduced; and motor eccentricities that tend to push the idler to the turntable or push it away are maintained.

Thus it is an object of the present invention to provide a turntable for minimizing rumble transmission during the playing of a phonograph record.

A further object of the present invention is to reduce the transmission of rumble due to angular deviation of the translated forces.

An additional object of the present invention is to reduce the transmission of vibrations caused by the motion of the turntable, the tone arm, the motor and its drive system and electro-magnetic coupling from the motor to the transducing region.

Another object of the present invention is to reduce extraneous mechanical vibrations which result in motion between the tone arm and the record by use of a novel record player turntable drive geometrical relationship.

Other objects and advantages of the invention will be shown in the following detailed description of a preferred embodiment which is illustrated in the accompanying drawing comprising a plan view of a record changer turntable showing a preferred geometric positionment of the tone arm and in a broken-away section the changer drive.

Referring now to the drawing, a rotatably supported turntable 10 is shown having a centrally positioned pin 11 for positioning a grooved phonograph record 12 on the turntable. A cantilever tone arm 14 is pivotally mounted at 15 so as to have a movable free end to which a needle 16 is attached for contacting the grooves of the record and reproducing the sounds recorded thereon. As the free end of the tone arm moves, an arc 17 of needle travel is described.

A centrally supported rotatable idler 20 contacts a turntable surface which is concentric with the pin at a point on a radial axis 22 passing through the center of rotation of the turntable and the center of the idler. A tangential contact line 21 is thus defined between the turntable and the idler at the point of contact 23.

In a preferred embodiment an extending flange, such as rim 18, circumferentially depends from the turntable 10. A motor pulley 24 driven by a multi-speed motor (not shown) contacts the circumference of the idler 20 at a point 25 on an idler-motor pulley axis 26 which is established by the center of the idler 20 and the center of the motor pulley 24.

The radial axis 22 and the tangential contact 23 provide reference points which establish a neutral axis 28. The neutral axis 28 is a diameter passing through the center of the turntable 10 with said neutral axis 28 being substantially normal to the radial axis 22 and substantially parallel to the tangential contact line 21.

By locating the point of contact 23 between the idler and the turntable at substantially 90 degrees from the idler-motor pulley axis 26 and the neutral axis 28, objectionable rumble is substantially reduced. Further the tone arm is mounted so that the arc described by the needle as it tracks across the record substantially follows the neutral axis. The tone arm may be mounted so that the path described by the needle is radial. The needle would then contact the grooves of the record along and on the neutral axis. By such novel changer drive geometry and needle path positionment vertical vibrations transmitted to the turntable by the idler would be such that the sound pickup is substantially on the neutral axis. Lateral vibrations transmitted by the idler would be parallel to the groove being played and would not be reproduced. By placing the motor pulley contact point 25 on the idler-motor pulley axis 26, motor eccentricities that tend to push the idler to the turntable or push it away are minimized. It is possible to eliminate the idler, position the motor pulley on the radial axis, and rotate the turntable by the drive pulley 24 turning the turntable directly.

To further explain the advantages of the present invention, assume that the motor drive pulley surface is eccentric. If the radial axis and the idler-motor pulley axis coincide, and the idler force is directed toward the concentric turntable surface, any eccentricity would result in a radial force on the turntable at the motor rate. Since motion must have an amplitude of one-millionth of an inch to occur within the objectionable audible range, turntable bearings cannot be considered to prohibit the resulting motion due to the force. When the idler-motor pulley axis is substantially normal to the radial axis, the force on the idler is parallel to the tangential contact line between the idler and the turntable and can impart no lateral translatory forces to the turntable. As the idler force is directed away from the concentric turntable surface, any motor drive pulley surface eccentricities again change the radial force on the turntable due to idler contact.

If the motor pulley drive surface were to impart a vertical force to the idler surface on contact, a similar analysis would show that when the idler-motor pulley axis is approximately normal to the radial axis, an axis of idler tilt would lie on the radial axis and no vertical forces could be imparted to the turntable. Vertical forces would occur when the axes vary substantially from the normal.

Some vibrational force will be transmitted to the idler-turntable contact due to imperfections in the idler drive surface. These forces can be resolved into three components relative to the turntable, that is, vertical, radial, and tangential. The vertical forces result in a vibrational tipping of the turntable; the radial forces result in a lateral translation of the turntable; and the tangential forces result in small speed irregularities but at an amplitude too small to be of concern.

While the turntable bearing system can modulate the translation and tipping of the turntable, the amplitudes are too small to prohibit, with an otherwise satisfactory bearing system. An examination of the vertical and radial forces reveal that if the needle contact point is on the neutral axis of the tipping motion, it will not be affected. The lateral translation will be parallel to the playing groove at the needle point and can only result in an insignificant speed modulation.

In a preferred embodiment, the idler-motor pulley axis 26 and the neutral axis 28 are substantially parallel to each other and both are at a 90 degree relationship to the radial axis 22. The typical practical limit for idler-motor pulley angle is from 85 to 95 degrees.

With a typical multi-speed phonograph, the path of needle travel across the record is an arc. The nominal design should be for the smallest deviation from an optimum path along the neutral axis. A precise needle point contact with the neutral axis can be achieved at only two points during the playing of a record due to the arc of tone arm swing. In a preferred embodiment, a point 30 in the needle arc at the start of recorded music and on the neutral axis 28 is selected as shown in the drawing. This point is selected for minimum rumble transmission. Rumble is normally worse on the outside edge of a record since turntable vibration, other than strict translatory motions, increase with the distance from the supporting bearings. Therefore in the unmodulated areas of the lead-in grooves rumble will be generally higher than the trip grooves. At this location the rumble is normally longer in playing time also. At the start of record playing there is normally a reduced sound level in the listening area which makes a rumble at the onset of playing more noticeable than at the cross-over points following music or at the end of the music.

While it is preferred that the arc of needle travel intersect the neutral axis at a point in the record grooves where the sound begins, it is within the scope of the present invention that the arc of needle travel intersect the neutral axis at any point within the area of the record containing the trip grooves. Preferredly a contact axis established by the starting point 30 and the center of the turntable coincides with the neutral axis, however, the contact axis may vary 5° on either side of the neutral axis. The contact axis and the idler-motor pulley axis as they relate to the radial axis can be held to within a few degrees of the preferred practical limits. The transmission of rumble due to any angular deviation from these limits is somewhat complex but would be proportional to the sine of the angular deviation.

Thus the present invention provides a record changer turntable which delivers a more faithful reproduction of the original sound without distortion due to extraneous mechanical vibrations that occur from relative motion between the tone arm and the record.

I claim:

1. In a record player comprising an axially rotatable turntable adapted to support helically grooved records for coaxial rotation with the turntable, said turntable having a cylindrical driving surface coaxial with its axis of rotation, a tone arm pivotally mounted on the player to one side of the turntable such that its needle follows an arcuate path inwardly toward the center of rotation of the turntable as the needle tracks in the groove of the record with rotation of the record by the turntable during the record play, the improvement wherein drive means for rotating the turntable comprises a supported idler pulley which contacts the cylindrical driving surface of the turntable at a point along a radial axis passing through the center of rotation of the turntable and the center of the idler pulley, the turntable having a neutral axis intersecting said center of rotation at right angles to said radial axis about which the turntable tips in response to vertical forces exerted thereon by the idler pulley, and a motor-driven pulley which drivingly engages the idler pulley at a point along a drive axis defined by the center of the idler pulley and the drive pulley, said drive axis being at right angles to said radial axis such that radial motion imparted thereby to the idler pulley is parallel to said neutral axis, and the arcuate path of the tone arm needle being generally along said neutral axis so as to minimize relative motion between the record and tone arm needle in response to motion imparting forces exerted on the turntable by the drive means and intersecting said neutral axis at a distance from the center of rotation of the turntable corresponding to the radius of the lead in groove of the record played thereon whereby to minimize audible rumble at the start of record play.

References Cited

FOREIGN PATENTS

| | | |
|---|---|---|
| 218,630 | 11/1958 | Australia. |
| 581,876 | 8/1959 | Canada. |

HARRY N. HAROIAN, *Primary Examiner.*